US012731108B2

(12) United States Patent
Jiang et al.

(10) Patent No.: US 12,731,108 B2
(45) Date of Patent: Sep. 8, 2026

(54) ELECTRONIC RECEIPT MAIL PROCESSING

(71) Applicant: Alipay (Hangzhou) Information Technology Co., Ltd., Hangzhou (CN)

(72) Inventors: Feilong Jiang, Hangzhou (CN); Jian Liu, Hangzhou (CN); Haitao Shen, Hangzhou (CN); Junwei Wang, Hangzhou (CN); Lijian Chen, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 227 days.

(21) Appl. No.: 18/563,749

(22) PCT Filed: Jul. 4, 2022

(86) PCT No.: PCT/CN2022/103549
§ 371 (c)(1),
(2) Date: Nov. 22, 2023

(87) PCT Pub. No.: WO2022/247967
PCT Pub. Date: Dec. 1, 2022

(65) Prior Publication Data

US 2024/0273472 A1 Aug. 15, 2024

(30) Foreign Application Priority Data

May 25, 2021 (CN) ........................ 202110573812.5

(51) Int. Cl.
*G06F 16/955* (2019.01)
*G06F 16/903* (2019.01)
(Continued)

(52) U.S. Cl.
CPC ....... *G06Q 10/107* (2013.01); *G06F 16/9558* (2019.01); *G06Q 30/04* (2013.01)

(58) Field of Classification Search
CPC .. G06Q 10/107; G06Q 30/04; G06F 16/9558; G06F 16/90335
See application file for complete search history.

(56) References Cited

U.S. PATENT DOCUMENTS 8,775,623 B2 * 7/2014 Christenson ........ H04L 61/5046 709/221
9,058,591 B2 * 6/2015 Killoran, Jr. ............ H04L 51/18
(Continued)

FOREIGN PATENT DOCUMENTS

CN 106549853 A 3/2017
CN 107424065 A 12/2017
(Continued)

OTHER PUBLICATIONS

The International Search Report and Written Opinion of the Searching Authority for International Application No. PCT/CN2022/103549 mailed on Oct. 8, 2022.
(Continued)

*Primary Examiner* — Chris Parry
*Assistant Examiner* — Hassan Abdur-Rahman Khan

(57) ABSTRACT

One or more embodiments of this specification disclose e-bill mail processing methods and apparatuses. The method includes following: To-be-processed identification information used to identify an organization corresponding to a target bill mail is determined; the to-be-processed identification information is matched with identification information corresponding to each organization included in a pre-established bill mail template library; a bill link included in the target bill mail is obtained based on a matching result; and an e-bill corresponding to the target bill mail is obtained based on the bill link.

12 Claims, 5 Drawing Sheets

(51) Int. Cl.
*G06Q 10/107* (2023.01)
*G06Q 30/04* (2012.01)

(56) References Cited

U.S. PATENT DOCUMENTS

| | | | | |
|---|---|---|---|---|
| 9,152,980 | B2 * | 10/2015 | Killoran, Jr. | G06Q 10/107 |
| 9,313,151 | B1 * | 4/2016 | Wheeler | G06Q 10/107 |
| 10,217,092 | B1 * | 2/2019 | Maxwell | G06Q 20/047 |
| 2012/0185382 | A1 * | 7/2012 | Fischer | G06Q 30/04 705/40 |
| 2013/0290710 | A1 * | 10/2013 | Broder | G06Q 30/04 713/168 |
| 2015/0100468 | A1 * | 4/2015 | Blackhurst | G06Q 40/02 705/35 |
| 2016/0071074 | A1 * | 3/2016 | Baird | G06Q 20/3265 705/40 |
| 2017/0017939 | A1 * | 1/2017 | Killoran, Jr. | G06Q 10/1097 |
| 2018/0137506 | A1 * | 5/2018 | Kcl | G06Q 20/401 |
| 2020/0026914 | A1 * | 1/2020 | Punzalan | G06V 30/416 |
| 2021/0105589 | A1 * | 4/2021 | Kassemi | H04L 67/10 |
| 2021/0150598 | A1 * | 5/2021 | Guillon | G06Q 10/107 |
| 2025/0252506 | A1 * | 8/2025 | Wang | G06Q 40/12 |

FOREIGN PATENT DOCUMENTS

| | | | |
|---|---|---|---|
| CN | 110738784 | A | 1/2020 |
| CN | 111192019 | A | 5/2020 |
| CN | 111628927 | A | 9/2020 |
| CN | 113221036 | A | 8/2021 |

OTHER PUBLICATIONS

"IP Office of Singapore: Search Report and Written Opinion" regarding Application No. 11202308670X, mailed on Nov. 1, 2029, 2025, pp. 1-9.

* cited by examiner

ELECTRONIC RECEIPT MAIL PROCESSING

This application is a national phase entry of International Application No. PCT/CN2022/103549 filed on Jul. 4, 2022, which claims priority to Chinese Application No. 202110573812.5 filed on May 25, 2021, the contents of which are incorporated by reference herein in their entirety.

TECHNICAL FIELD

This specification relates to the field of Internet technologies, and in particular, to e-bill mail processing methods and apparatuses.

BACKGROUND

When issuing bills, merchants usually deliver e-bills to users by including download addresses in mail attachments or mail bodies. When using the bills, the users need to extract the e-bills from bill mails manually, which is time-consuming and labor-intensive, resulting in low efficiency.

In the related technology, the bill mails are usually classified into mails with bill attachments and mails without bill attachments. Bill files in the bill mails without bill attachments need to be obtained through bill links. However, locations of the bill links in the bill mails are usually uncertain, and consequently an error is prone to occur in obtaining a bill library link. In addition, the bill file can be obtained in various ways from the bill link. The bill file can be downloaded directly or can be downloaded through interaction with a bill service provider. Because supported parsing methods usually require customized development, downloading the bill file requires high costs and has low efficiency.

SUMMARY

According to an aspect, one or more embodiments of this specification provide an e-bill mail processing method. The e-bill mail processing method includes following: To-be-processed identification information used to identify an organization corresponding to a target bill mail is determined; the to-be-processed identification information is matched with identification information corresponding to each organization included in a pre-established bill mail template library; a bill link included in the target bill mail is obtained based on a matching result; and an e-bill corresponding to the target bill mail is obtained based on the bill link.

According to another aspect, one or more embodiments of this specification provide an e-bill mail processing apparatus, including: a determining module, configured to determine to-be-processed identification information used to identify an organization corresponding to a target bill mail; a matching module, configured to match the to-be-processed identification information with identification information corresponding to each organization included in a pre-established bill mail template library; a first acquisition module, configured to obtain a bill link included in the target bill mail based on a matching result; and a second acquisition module, configured to obtain an e-bill corresponding to the target bill mail based on the bill link.

According to still another aspect, one or more embodiments of this specification provide an e-bill mail processing device, including a processor and a memory electrically connected to the processor. The memory stores a computer program, and the processor is configured to invoke the computer program from the memory and execute the computer program to: determine to-be-processed identification information used to identify an organization corresponding to a target bill mail; match the to-be-processed identification information with identification information corresponding to each organization included in a pre-established bill mail template library; obtain a bill link included in the target bill mail based on a matching result; and obtain an e-bill corresponding to the target bill mail based on the bill link.

According to still another aspect, one or more embodiments of this specification provide a storage medium, configured to store a computer program. The computer program can be executed by a processor to implement the following procedure: determining to-be-processed identification information used to identify an organization corresponding to a target bill mail; matching the to-be-processed identification information with identification information corresponding to each organization included in a pre-established bill mail template library; obtaining a bill link included in the target bill mail based on a matching result; and obtaining an e-bill corresponding to the target bill mail based on the bill link.

BRIEF DESCRIPTION OF DRAWINGS

To describe the technical solutions in one or more embodiments of this specification or in the existing technology more clearly, the following briefly describes the accompanying drawings needed for describing the embodiments or the existing technology. Clearly, the accompanying drawings in the following descriptions merely show some of the one or more embodiments of this specification, and a person of ordinary skill in the art can still derive other drawings from these accompanying drawings without creative efforts.

DESCRIPTION OF EMBODIMENTS

One or more embodiments of this specification provide an e-bill mail processing method and apparatus.

To make a person skilled in the art understand the technical solutions in one or more embodiments of this specification better, the following clearly and comprehensively describes the technical solutions in the one or more embodiments of this specification with reference to the accompanying drawings in the one or more embodiments of this specification. Clearly, the described embodiments are merely some but not all of the embodiments of this specification. All other embodiments obtained by a person of ordinary skill in the art based on the one or more embodiments of this specification without creative efforts shall fall within the protection scope of the one or more embodiments of this specification.

Figure 1:
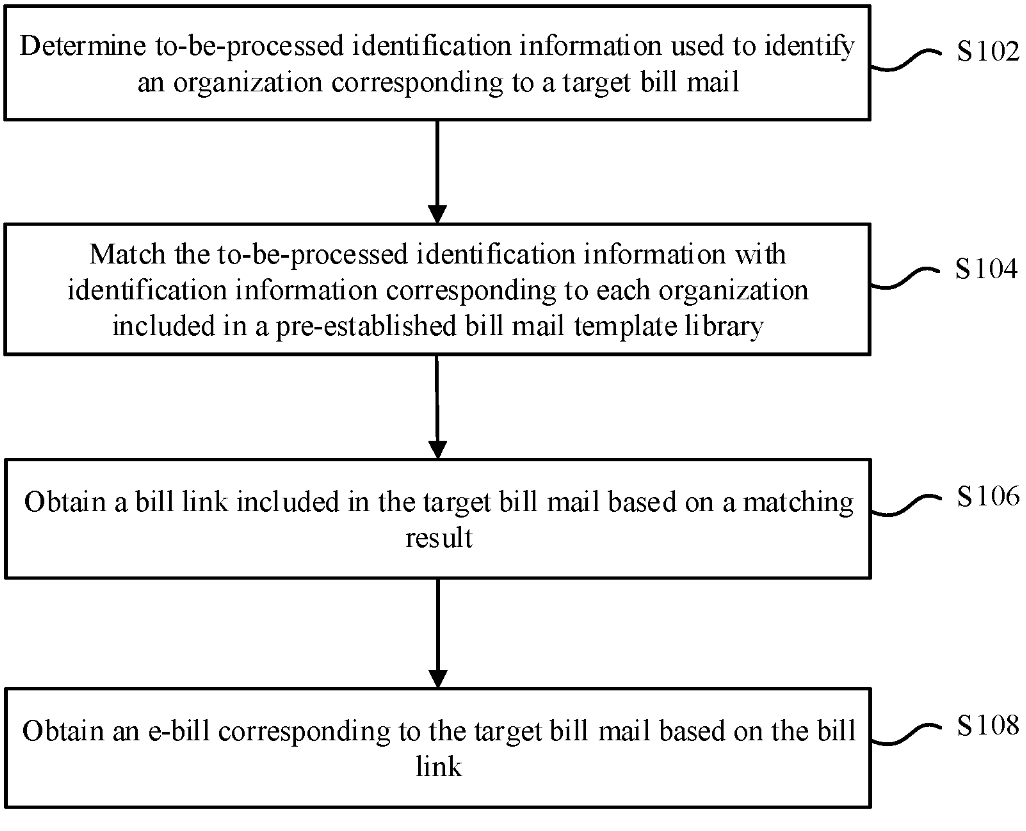
FIG. 1 is a schematic flowchart illustrating an e-bill mail processing method, according to one or more embodiments of this specification.

FIG. 1 is a schematic flowchart illustrating an e-bill mail processing method, according to one or more embodiments of this specification. As shown in FIG. 1, the method includes the following steps S102 to S108.

S102: Determine to-be-processed identification information used to identify an organization corresponding to a target bill mail.

The organization corresponding to the target bill mail can be an organization that sends the target bill mail. For example, when XX restaurant needs to provide an e-bill for a user, XX restaurant sends a target bill mail that includes a bill link to the user. In this case, "XX restaurant" is an organization corresponding to the target bill mail.

The to-be-processed identification information is used to identify an organization, for example, the to-be-processed identification information can be a unique identifier such as a name and a number of the organization. In one or more embodiments, the to-be-processed identification information corresponding to the target bill mail can be obtained from a location such as a mail subject, a sending address, and a mail body of the target bill mail. For example, the to-be-processed identification information is a name of an organization. Assuming that the mail subject of the target bill mail is "XX Co., Ltd. issues an e-invoice to you", the mail subject can be parsed to learn that the to-be-processed identification information is "XX Co., Ltd." Further, assuming that the mail body of the target bill mail includes keywords "seller name", the mail body can be parsed to learn that content corresponding to the "seller name" is the to-be-processed identification information corresponding to the target bill mail.

S104: Match the to-be-processed identification information with identification information corresponding to each organization included in a pre-established bill mail template library.

Each organization has one or more bill mail templates corresponding to the organization, and when the organization needs to issue an e-bill to a user, the organization sends a bill mail including a bill link to the user based on the bill mail template corresponding to the organization. The identification information is used to identify an organization, for example, the identification information can be a unique identifier such as a name and a number of the organization. The organization corresponding to identification information included in the pre-established bill mail template library can be an organization corresponding to a bill mail template that is identified and parsed historically.

S106: Obtain a bill link included in the target bill mail based on a matching result.

In the present step, the matching result can include that the matching succeeds or that the matching fails. For different matching results, methods for obtaining the bill link included in the target bill mail are different.

If the matching result is that the matching succeeds, that is, the bill mail template library includes target identification information corresponding to the organization that sends the target bill mail, it indicates that a bill mail template corresponding to the organization that sends the target bill mail has been parsed, and positioning information of the bill link in the bill mail template can be learned through parsing. Therefore, the bill link can be obtained from the target bill mail based on the positioning information of the bill link in the bill mail template.

If the matching result is that the matching fails, that is, the bill mail template library does not include the target identification information corresponding to the organization that sends the target bill mail, it indicates that the bill mail template corresponding to the organization that sends the target bill mail has not been parsed, and is a bill mail template unknown to an e-bill mail processing device. Therefore, the device needs to analyze the target bill mail to obtain position information of the bill link in the target bill mail to obtain the bill link. Analysis of the target bill mail is described in detail in the following embodiments.

S108: Obtain an e-bill corresponding to the target bill mail based on the bill link.

The organizations in the one or more embodiments include various forms of organizations such as enterprises, institutions, social groups, and firms. In addition, the organizations include not only an organization of a current level, but also an internal organization of the organization, such as an enterprise department or a branch.

According to the technical solution in the one or more embodiments of this specification, the to-be-processed identification information used to identify the organization corresponding to the target bill mail is determined, and the to-be-processed identification information is matched with the identification information corresponding to each organization included in the pre-established bill mail template library; then, the bill link included in the target bill mail is obtained based on the matching result; and further, the e-bill corresponding to the target bill mail is obtained based on the bill link. It can be seen that, in this technical solution, the bill mail template library is pre-established, so that when the e-bill is obtained from the target bill mail, it is unnecessary to perform mail parsing each time. As long as the bill mail is the bill mail of each organization maintained in the bill mail template library, the e-bill can be quickly obtained by matching an organization, so as to save manual costs of downloading the e-bill from the bill mail by a user, thereby intelligently obtaining the e-bill and improving accuracy and efficiency of obtaining the e-bill.

The following describes in detail how to obtain the e-bill based on different matching results after the to-be-processed identification information is matched with the identification information corresponding to each organization included in the bill mail template library (that is, S104).

In one or more embodiments, the bill mail template library further includes positioning information of a bill link in a bill mail corresponding to each organization. If matching between the to-be-processed identification information and the identification information corresponding to each organization included in the bill mail template library succeeds, positioning information corresponding to the bill link in the target bill mail is first determined based on the matched identification information, and then the bill link is obtained based on the positioning information.

The positioning information is used to position a location of the bill link in the bill mail, and can be a keyword used to point to the bill link, such as "bill link" or "bill download address". Specifically, first, a target organization corresponding to the target bill mail can be determined based on the matched identification information; then, location information of the bill link in the target bill mail is determined based on the positioning information corresponding to the target organization in the bill mail template library; and further, the bill link is obtained from the target bill mail based on the location information of the bill link.

If the positioning information is a keyword used to point to the bill link, when the location information of the bill link in the target bill mail is determined based on the positioning information corresponding to the target organization, the target bill mail can be searched for the keyword, and a link that the identified keyword points to is determined as the bill link. For example, if the keyword is "bill download address", the target bill mail can be searched for the keyword "bill download address" to obtain a bill link that the keyword "bill download address" points to.

Figure 2:
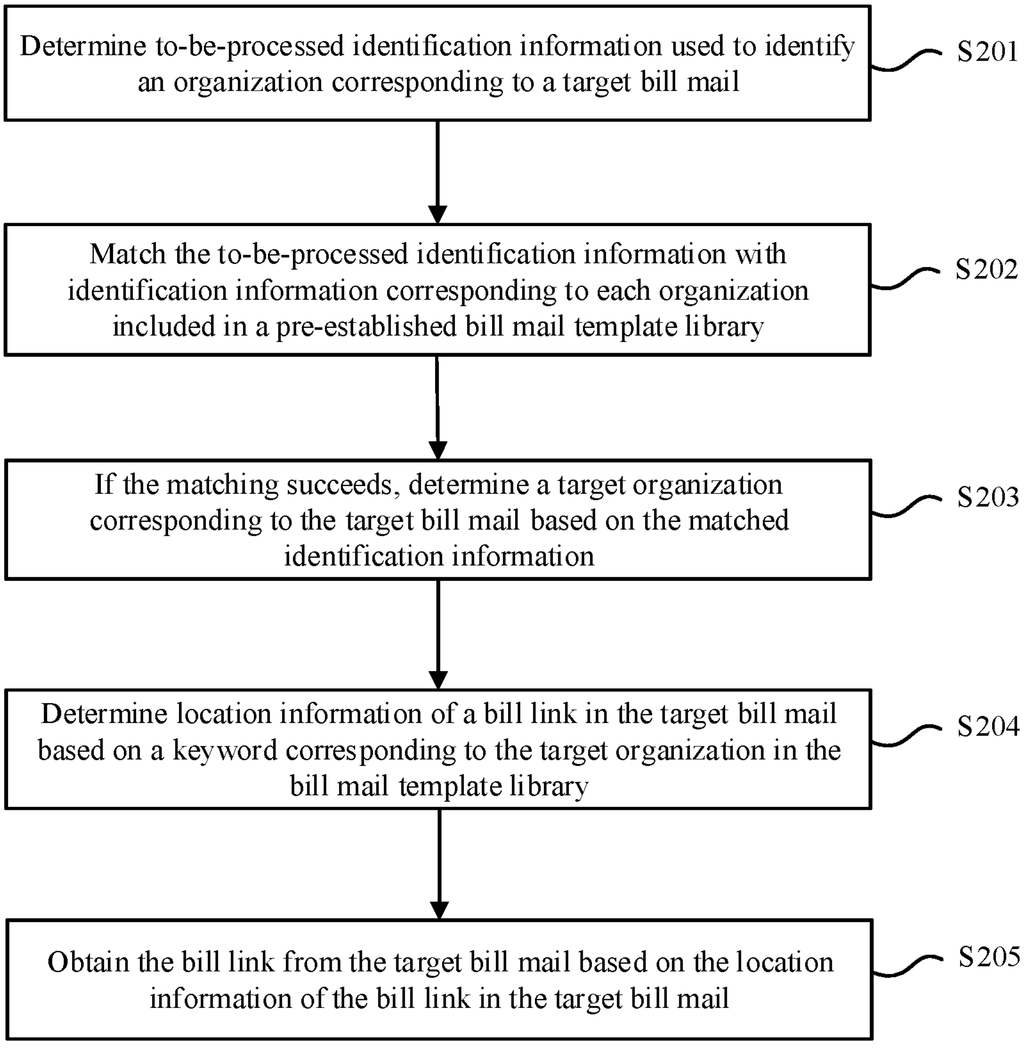
FIG. 2 is a schematic flowchart illustrating an e-bill mail processing method, according to other embodiments of this specification.

FIG. 2 is a schematic flowchart illustrating obtaining a bill link in a case that matching between to-be-processed identification information and identification information corresponding to each organization included in a bill mail template library succeeds. As shown in FIG. 2, the following steps S201 to S205 can be specifically included.

S201: Determine to-be-processed identification information used to identify an organization corresponding to a target bill mail.

S202: Match the to-be-processed identification information with identification information corresponding to each organization included in a pre-established bill mail template library.

The identification information is used to identify an organization, for example, the identification information can be a unique identifier such as a name and a number of the organization. In the one or more embodiments, the to-be-processed identification information corresponding to the target bill mail can be obtained from a location such as a mail subject, a sending address, and a mail body of the target bill mail. For example, the to-be-processed identification information is a name of an organization. Assuming that the mail subject of the target bill mail is "XX Co., Ltd. issues an e-invoice to you", the mail subject can be parsed to learn that the to-be-processed identification information is "XX Co., Ltd." Further, assuming that the mail body of the target bill mail includes keywords "seller name", the mail body can be parsed to learn that content corresponding to the "seller name" is the to-be-processed identification information corresponding to the target bill mail.

When the matching in S202 succeeds, the following steps S203 to S205 continue to be performed.

S203: If the matching succeeds, determine a target organization corresponding to the target bill mail based on the matched identification information.

In the one or more embodiments, the bill mail template library includes identification information corresponding to each organization and a keyword (that is, positioning information) used to point to a bill link in a bill mail corresponding to each organization.

Table 1 below shows a mapping relationship between identification information and a keyword that correspond to each organization in the bill mail template library in one or more embodiments.

TABLE 1

| Identification information of an organization | Keyword pointing to a bill link |
|---|---|
| Company A | E-invoice |
| Company B | Invoice link |
| Company C | Invoice download address |

It is worthwhile to note that, Table 1 merely shows several example keywords used to point to the bill link. In actual applications, the keywords corresponding to each organization in the bill mail template library can be customized based on an actual requirement, provided that the defined keywords can point to the bill link included in the bill mail.

S204: Determine location information of the bill link in the target bill mail based on a keyword corresponding to the target organization in the bill mail template library.

S205: Obtain the bill link from the target bill mail based on the location information of the bill link in the target bill mail.

In the one or more embodiments, the to-be-processed identification information corresponding to the target bill mail is matched with the identification information corresponding to each organization included in the bill mail template library, and when the matching succeeds, the bill link is positioned and obtained based on the positioning information corresponding to each organization maintained in the bill mail template library, without further parsing the target bill mail, thereby intelligently obtaining the bill link and improving accuracy and efficiency of obtaining the bill link.

In one or more embodiments, if matching between the to-be-processed identification information and the identification information corresponding to each organization included in the bill mail template library fails, a hyperlink included in the target bill mail can be identified, and the bill link is obtained based on an identification result.

Specifically, a hyperlink included in a specified mail location of the target bill mail can be obtained, where the specified mail location includes a mail attachment and/or a mail body; a to-be-processed keyword pointing to the hyperlink is determined, and the to-be-processed keyword is matched with a predetermined keyword set to obtain a second matching result; and the bill link is determined from the hyperlink based on the second matching result. If the second matching result is that the matching succeeds, the hyperlink is determined as the bill link; or if the second match result is that the matching fails, a download operation is performed based on the hyperlink, and the successfully downloaded hyperlink is determined as the bill link.

In one or more embodiments, for the successfully downloaded hyperlink, a keyword corresponding to the hyperlink can be obtained, that is, a keyword pointing to the hyperlink, and the obtained keyword is added to the keyword set to update the keyword set. As such, when the target bill mail received next time includes the hyperlink, the keyword pointing to the hyperlink and the keyword set can be successfully matched, to quickly position the bill link in the target bill mail.

In addition, positioning information corresponding to the bill link in the target bill mail can be determined based on location information of the successfully downloaded hyperlink in the target bill mail, and the determined positioning information and the to-be-processed identification information are correspondingly added to the bill mail template library to update the bill mail template library. As such, when the target bill mail corresponding to the same identification information is received next time, the same identification information and the bill mail template library can be successfully matched, to quickly position the bill link in the target bill mail.

When the positioning information included in the bill mail template library is used as the keyword in the keyword set, for the successfully downloaded hyperlink, the keyword pointing to the hyperlink can be added to the bill mail template library as the positioning information of the bill link, and is associated with the identification information corresponding to the target bill mail to update the bill mail template library.

For a hyperlink that fails to be downloaded, that is, all hyperlinks included in the target bill mail fail to be downloaded, the bill link in the target bill mail can be obtained manually, and the keyword pointing to the bill link is added to the keyword set, so that when the target bill mail received again includes the bill link, the keyword pointing to the bill link and the keyword set can be successfully matched, to quickly position the bill link in the target bill mail. In addition, the keyword pointing to the bill link can also be used as the positioning information of the bill link, and is associated with the identification information of the organization corresponding to the target bill mail to be added to the bill mail template library, so that when the target bill mail corresponding to the same identification information is received next time, the same identification information and the bill mail template library can be successfully matched, to quickly position the bill link in the target bill mail.

Figure 3:
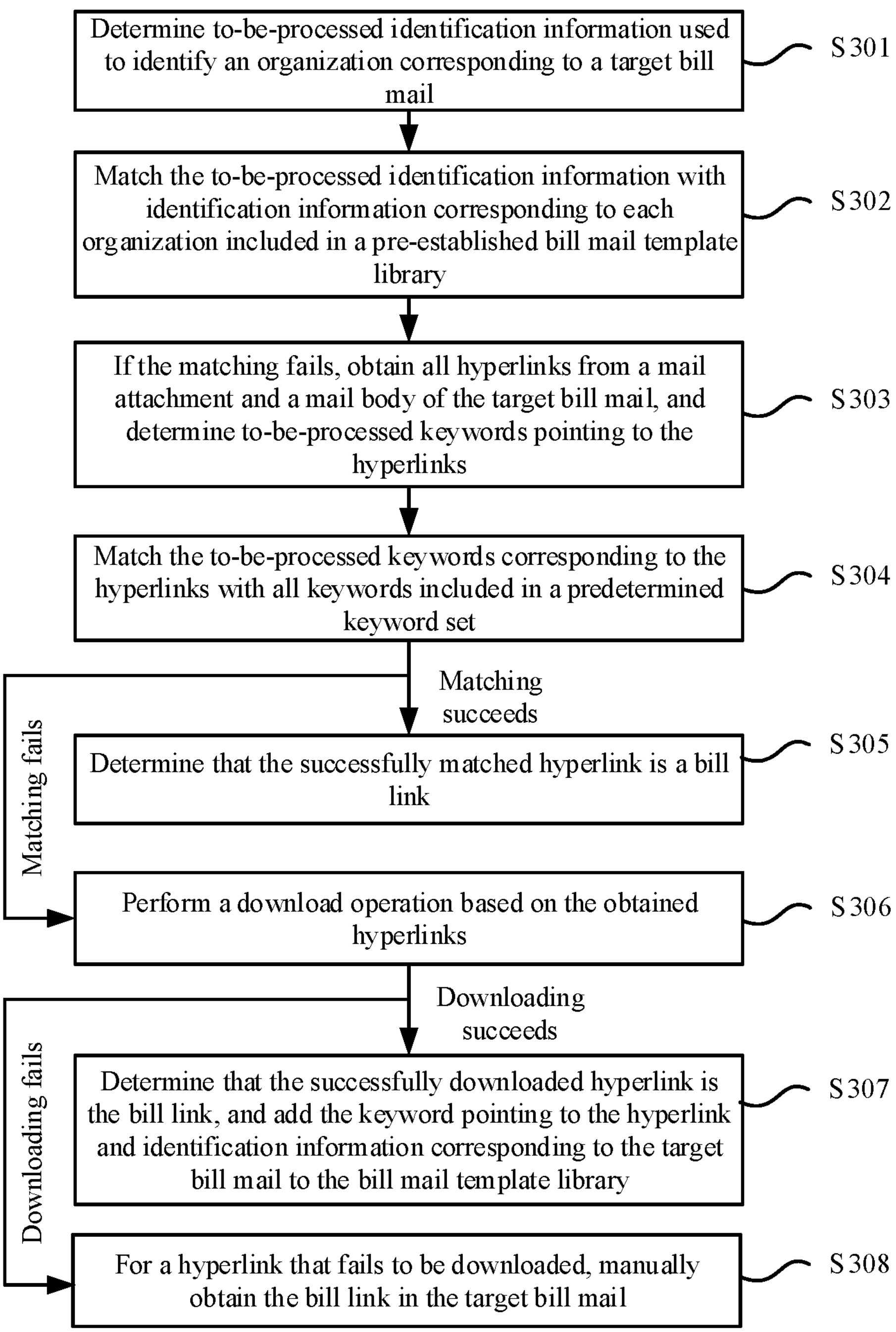
FIG. 3 is a schematic flowchart illustrating an e-bill mail processing method, according to still other embodiments of this specification.

FIG. 3 is a schematic flowchart illustrating obtaining a bill link in a case that matching between to-be-processed identification information and identification information corresponding to each organization included in a bill mail template library fails. As shown in FIG. 3, the following steps S301 to S308 can be specifically included.

S301: Determine to-be-processed identification information used to identify an organization corresponding to a target bill mail.

S302: Match the to-be-processed identification information with identification information corresponding to each organization included in a pre-established bill mail template library.

The identification information is used to identify an organization, for example, the identification information can be a unique identifier such as a name and a number of the organization. In the one or more embodiments, the to-be-processed identification information corresponding to the target bill mail can be obtained from a location such as a mail subject, a sending address, and a mail body of the target bill mail. For example, the to-be-processed identification information is a name of an organization. Assuming that the mail subject of the target bill mail is "XX Co., Ltd. issues an e-invoice to you", the mail subject can be parsed to learn that the to-be-processed identification information is "XX Co., Ltd." Further, assuming that the mail body of the target bill mail includes keywords "seller name", the mail body can be parsed to learn that content corresponding to the "seller name" is the to-be-processed identification information corresponding to the target bill mail.

When the matching in S302 fails, the following steps S303 to S308 continue to be performed.

S303: If the matching fails, obtain all hyperlinks from a mail attachment and a mail body of the target bill mail, and determine to-be-processed keywords pointing to the hyperlinks.

S304: Match the to-be-processed keywords corresponding to the hyperlinks with all keywords included in a predetermined keyword set; and perform S305 if the matching succeeds; or perform S306 if the matching fails.

The keyword is used to point to a bill link included in a bill mail. The keyword set can be set separately or can be set in the bill mail template library. If the keyword set is set in the bill mail template library, it is equivalent to matching the to-be-processed keywords pointing to the hyperlinks with a keyword (that is, positioning information) corresponding to each organization included in the bill mail template library.

In the present step, if the matching fails, it indicates that all the to-be-processed keywords pointing to the hyperlinks are not included in the predetermined keyword set.

S305: Determine that the successfully matched hyperlink is the bill link.

S306: Perform a download operation based on the obtained hyperlinks; and perform S307 if the downloading succeeds; or perform S308 if the downloading fails.

S307: Determine that the successfully downloaded hyperlink is the bill link, and add the keyword pointing to the hyperlink and identification information corresponding to the target bill mail to the bill mail template library.

It is assumed that the organization corresponding to the target bill mail is "Company D". Based on Table 1, it can be seen that the identification information corresponding to Company D is not included in the bill mail template library, which indicates that a bill mail corresponding to Company D does not belong to bill mails maintained in the bill mail template library. Therefore, after receiving the target bill mail sent by Company D, if the identification information "Company D" is matched with the bill mail template library, a result is inevitably that the matching fails. In this case, after the target bill mail is parsed, the keyword "invoice download address" pointing to the bill link can be associated with the identification information "Company D" to be added to the bill mail template library by using the bill link obtained after parsing, as shown in Table 2 below.

TABLE 2

| Identification information of an organization | Keyword pointing to a bill link |
|---|---|
| Company A | E-invoice |
| Company B | Invoice link |
| Company C | Invoice download address |
| Company D | Invoice download address |

S308: For a hyperlink that fails to be downloaded, manually obtain the bill link in the target bill mail.

Afterwards, for the manually obtained bill link, a keyword pointing to the bill link can further be used as positioning information of the bill link, and is associated with the identification information of the organization corresponding to the target bill mail to be added to the bill mail template library.

In the one or more embodiments, the to-be-processed identification information corresponding to the target bill mail is matched with the identification information corresponding to each organization included in the bill mail template library, and when the matching fails, the target bill mail can be automatically parsed and the bill link can be accurately obtained, so as to save manual costs of searching the bill mail for the bill link by a user, thereby intelligently obtaining the bill link and improving accuracy and efficiency of obtaining the bill link. In addition, the positioning information of the bill link in the target bill mail that fails to be matched is associated with the corresponding identification information to be added to the bill mail template library, so that the bill mail template library can be automatically updated based on a constant change and a newly added bill mail template, thereby avoiding a case that the organization cannot maintain the bill mail template in time when the bill mail template is changed or a bill mail template is newly added. Therefore, regardless of a type of a received bill mail, the bill link can be intelligently and accurately obtained, thereby improving accuracy and efficiency of obtaining the bill link.

In one or more embodiments, after the bill link is obtained, an e-bill corresponding to the target bill mail can be obtained based on the bill link. Specifically, downloading can be directly performed based on the bill link. If the downloading succeeds, the e-bill corresponding to the bill link can be obtained; or if the downloading fails, the bill link needs to be requested, and when a response state of a response body corresponding to the request is normal, the e-bill corresponding to the target bill is obtained based on a file type of the response body. If file types of the response body are different, methods for obtaining the e-bill are different.

Figure 4:
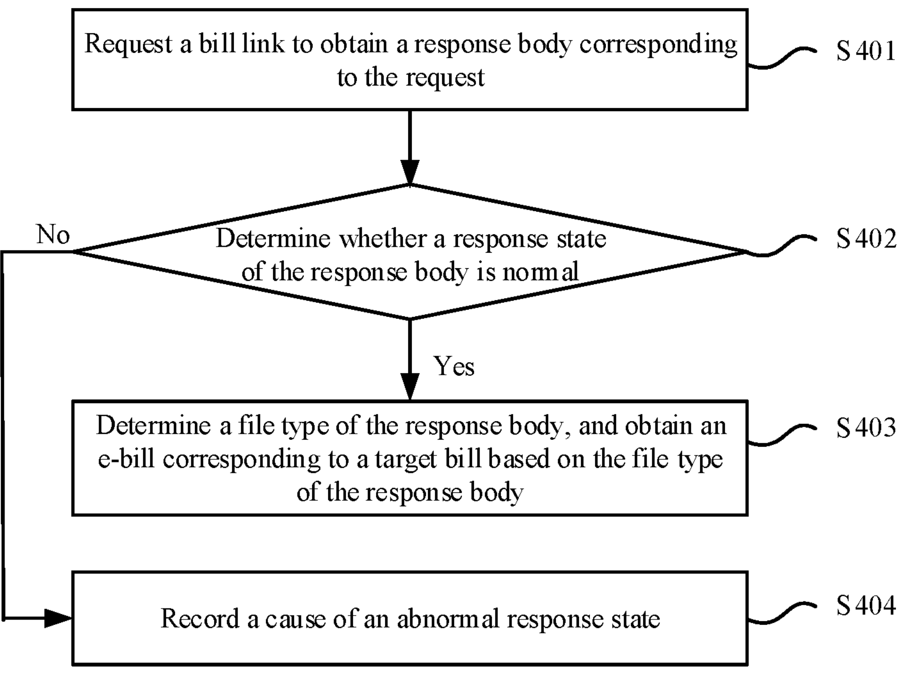
FIG. 4 is a schematic flowchart illustrating an e-bill mail processing method, according to still other embodiments of this specification.

FIG. 4 is a schematic flowchart illustrating an e-bill acquisition method, according to one or more embodiments of this specification. As shown in FIG. 4, the following steps S401 to S404 can be specifically included.

S401: Request a bill link to obtain a response body corresponding to the request.

S402: Determine whether a response state of the response body is normal; and if yes, perform S403; or if no, perform S404.

In the one or more embodiments, after the bill link is requested, if the response body indicating that the request is successfully responded to can be received from a network side, for example, a state code such as "200", it indicates that the response state of the response body is normal. If the response body that is returned by the network side and that indicates that the request fails to be responded to, for example, if a state code such as "300" is received, it indicates that the response state of the response body is abnormal.

S403: Determine a file type of the response body, and obtain an e-bill corresponding to a target bill based on the file type of the response body.

The file type of the response body includes a downloadable first file type, and the first file type can include a convenient document format (such as application/pdf) type, a file stream (such as application/octet-stream) type, etc.; and can further include a non-downloadable second file type, such as a text, a html (HyperText Markup Language) type, etc.

If the file type of the response body is the downloadable first file type, a download operation can be performed based on the response body to obtain the e-bill.

If the file type of the response body is the non-downloadable second file type, a parsing method corresponding to the bill link can be determined based on the file type of the response body, the bill link is further parsed based on the determined parsing method, and the e-bill is obtained based on a parsing result. For example, for a non-downloadable text or html type file, the corresponding bill link can be parsed based on a parsing method corresponding to the text or the html to obtain the e-bill. The parsing method corresponding to the text or the html belongs to the existing technology, and details are omitted here for simplicity.

It is worthwhile to note that, "downloadable" in the one or more embodiments means that the e-bill can be downloaded by directly triggering the bill link. For a method that the bill link is parsed and the e-bill is obtained based on the parsing result belongs to a "non-downloadable" case.

S404: Record a cause of an abnormal response state.

In the present step, advantages of recording the cause of the abnormal response state lies in the following: A user can analyze the bill link based on the recorded cause of the abnormity to obtain, through analysis, a bill link that cannot be identified and parsed by an e-bill mail processing device, thereby helping the e-bill mail processing device identify various types of bill links, and improving a processing capability of the e-bill mail processing device, so that the bill link can be parsed successfully when the bill link is parsed again.

In the one or more embodiments, after the bill link is obtained, for the bill link that can be directly downloaded, the e-bill is obtained through a download operation, and for the bill link that cannot be directly downloaded, the bill link can be automatically parsed, and the e-bill corresponding to the bill link is obtained based on a corresponding parsing method. It can be seen that, in the technical solution in the one or more embodiments, all types of bill links can be identified and parsed, so that regardless of a type of an obtained bill link, a corresponding e-bill can be automatically obtained, so as to save manual costs of manually downloading the bill link by a user, thereby improving accuracy and efficiency of obtaining the e-bill.

In conclusion, specific embodiments of the subject matter have been described. Other embodiments fall within the scope of the appended claims. In some cases, the actions described in the claims can be performed in different orders, and the desired results can still be achieved. In addition, the processes depicted in the accompanying drawings do not necessarily need a particular order or consecutive order to achieve the desired results. In some implementations, multitasking and parallel processing are feasible or may be advantageous.

The e-bill mail processing method provided in one or more embodiments of this specification is described above. Based on the same idea, one or more embodiments of this specification further provide an e-bill mail processing apparatus.

Figure 5:
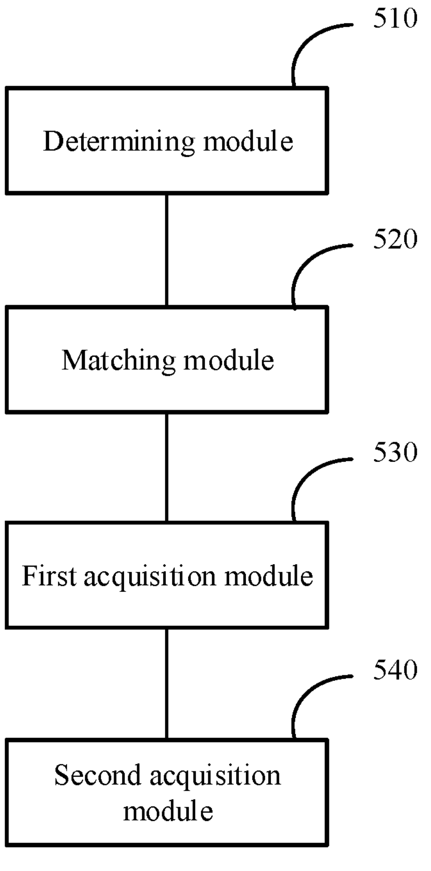
FIG. 5 is a schematic block diagram illustrating an e-bill mail processing apparatus, according to one or more embodiments of this specification.

FIG. 5 is a schematic block diagram illustrating an e-bill mail processing apparatus, according to one or more embodiments of this specification. As shown in FIG. 5, the apparatus includes: a determining module 510, configured to determine to-be-processed identification information used to identify an organization corresponding to a target bill mail; a matching module 520, configured to match the to-be-processed identification information with identification information corresponding to each organization included in a pre-established bill mail template library; a first acquisition module 530, configured to obtain a bill link included in the target bill mail based on a matching result; and a second acquisition module 540, configured to obtain an e-bill corresponding to the target bill mail based on the bill link.

In one or more embodiments, the first acquisition module 530 includes: a first acquisition unit, configured to: if the matching result is that the matching succeeds, determine positioning information corresponding to the bill link in the target bill mail based on the matched identification information, and obtain the bill link based on the positioning information, where the bill mail template library further includes positioning information of a bill link in a bill mail corresponding to each organization; and a second acquisition unit, configured to: if the matching result is that the matching fails, identify a hyperlink included in the target bill mail, and obtain the bill link based on an identification result.

In one or more embodiments, the first acquisition unit determines a target organization corresponding to the target bill mail based on the matched identification information; determines location information of the bill link in the target bill mail based on the positioning information corresponding to the target organization; and obtains the bill link from the target bill mail based on the location information.

In one or more embodiments, the positioning information includes a keyword used to point to the bill link; and the first acquisition unit searches the target bill mail for the keyword, and determines a link that the identified keyword points to as the bill link.

In one or more embodiments, the second acquisition unit obtains a hyperlink included in a specified mail location of the target bill mail, where the specified mail location includes a mail attachment and/or a mail body; determines a to-be-processed keyword pointing to the hyperlink, and matches the to-be-processed keyword with a predetermined keyword set to obtain a second matching result, where the keyword set includes at least one keyword used to point to the bill link; and determines the bill link from the hyperlink based on the second matching result.

In one or more embodiments, the second acquisition unit is configured to: if the second matching result is that the matching succeeds, determine that the hyperlink is the bill link; or if the second matching result is that the matching fails, perform a download operation based on the hyperlink, and determine that the successfully downloaded hyperlink is the bill link.

In one or more embodiments, the apparatus further includes: a third acquisition module, configured to: after the performing a download operation based on the hyperlink, obtain a keyword corresponding to the successfully downloaded hyperlink; and a first adding module, configured to add the obtained keyword to the keyword set to update the keyword set.

In one or more embodiments, the apparatus further includes: a second determining module, configured to: after the determining that the successfully downloaded hyperlink is the bill link, determine positioning information corresponding to the bill link in the target bill mail based on location information of the successfully downloaded hyperlink in the target bill mail; and a second adding module, configured to correspondingly add the positioning information corresponding to the bill link in the target bill mail and the to-be-processed identification information to the bill mail template library, to update the bill mail template library.

In one or more embodiments, the second acquisition module 540 includes: a request unit, configured to request the bill link to obtain a response body corresponding to the request; a determining unit, configured to determine a file type of the response body if a response state of the response body is normal; and a third acquisition unit, configured to obtain the e-bill corresponding to the target bill based on the file type of the response body.

In one or more embodiments, the third acquisition unit is configured to: if the file type is a downloadable first file type, perform a download operation based on the response body to obtain the e-bill; or if the file type is a non-downloadable second file type, determine a parsing method corresponding to the bill link based on the file type, parse the bill link based on the determined parsing method, and obtain the e-bill based on a parsing result.

In one or more embodiments, the first file type includes at least one of the following: a convenient document format and a file stream, and the second file type includes at least one of the following: a text and a hypertext markup language.

According to the apparatus in one or more embodiments of this specification, the to-be-processed identification information used to identify the organization corresponding to the target bill mail is determined, and the to-be-processed identification information is matched with the identification information corresponding to each organization included in the pre-established bill mail template library; then, the bill link included in the target bill mail is obtained based on the matching result; and further, the e-bill corresponding to the target bill mail is obtained based on the bill link. It can be seen that, in this technical solution, the bill mail template library is pre-established, so that when the e-bill is obtained from the target bill mail, it is unnecessary to perform mail parsing each time. As long as the bill mail is the bill mail of each organization maintained in the bill mail template library, the e-bill can be quickly obtained by matching an organization, so as to save manual costs of downloading the e-bill from the bill mail by a user, thereby intelligently obtaining the e-bill and improving accuracy and efficiency of obtaining the e-bill.

A person skilled in the art should understand that, the e-bill mail processing apparatus can be used to implement the e-bill mail processing method described above. Detailed descriptions in the apparatus are similar to those in the previous method part. To avoid tediousness, details are omitted here for simplicity.

Figure 6:
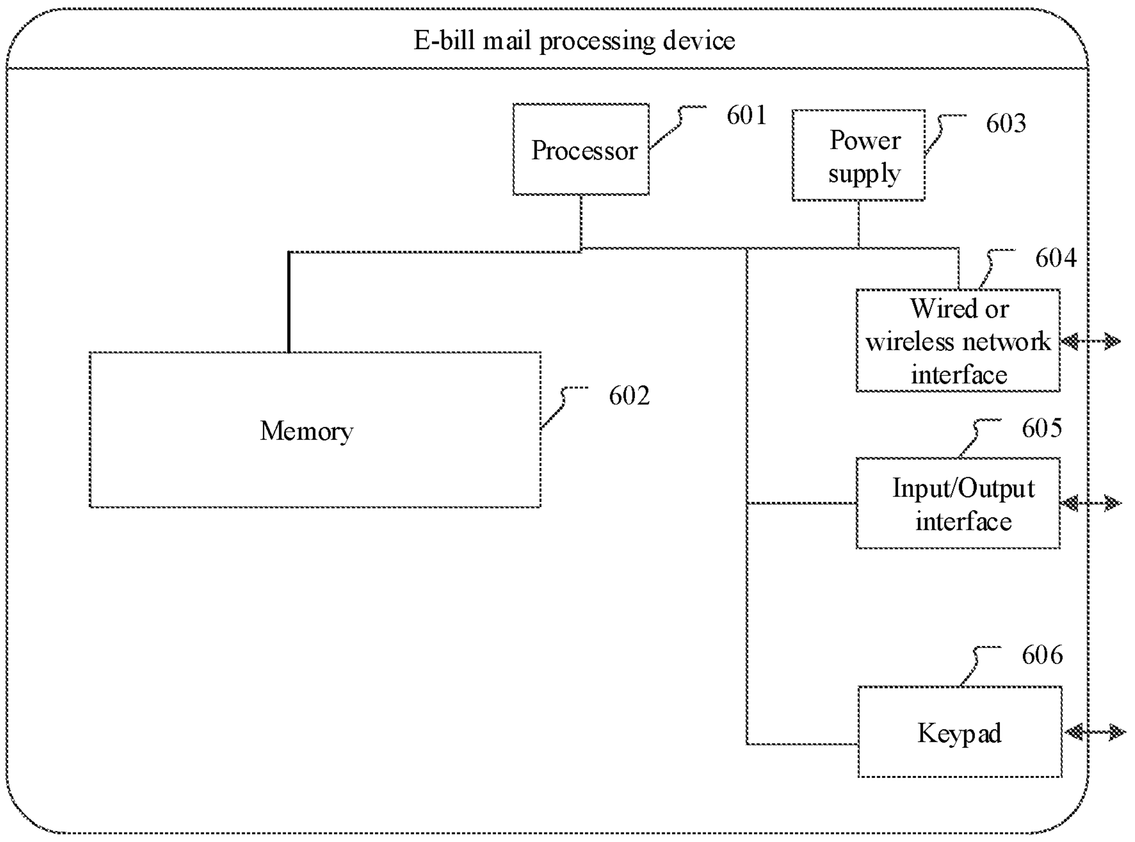
FIG. 6 is a schematic block diagram illustrating an e-bill mail processing device, according to one or more embodiments of this specification.

Based on the same idea, one or more embodiments of this specification further provide an e-bill mail processing device, as shown in FIG. 6. The e-bill mail processing device may vary greatly due to a difference in configuration or performance, and can include one or more processors 601 and a memory 602. The memory 602 can store one or more storage applications or data. The memory 602 can be a temporary storage or persistent storage. The application stored in the memory 602 can include one or more modules (not shown in the figure), and each module can include a series of computer-executable instructions in the e-bill mail processing device. Further, the processor 601 can be configured to communicate with the memory 602, and execute the series of computer-executable instructions in the memory 602 on the e-bill mail processing device. The e-bill mail processing device can further include one or more power supplies 603, one or more wired or wireless network interfaces 604, one or more input/output interfaces 605, and one or more keypads 606.

Specifically, in the one or more embodiments, the e-bill mail processing device includes a memory and one or more programs. The one or more programs are stored in the memory, and the one or more programs can include one or more modules. Each module can include a series of computer-executable instructions in the e-bill mail processing device. One or more processors are configured to execute computer-executable instructions included in the one or more programs to: determine to-be-processed identification information used to identify an organization corresponding to a target bill mail; match the to-be-processed identification information with identification information corresponding to each organization included in a pre-established bill mail template library; obtain a bill link included in the target bill mail based on a matching result; and obtain an e-bill corresponding to the target bill mail based on the bill link.

One or more embodiments of this specification further provide a storage medium. The storage medium stores one or more computer programs. The one or more computer programs include instructions. When the instructions are executed by an electronic device including a plurality of applications, the electronic device can execute processes in the previous embodiments of the e-bill mail processing method, and the same technical effect can be achieved. To avoid repetition, details are omitted here for simplicity.

The system, apparatus, module, or unit illustrated in the previous embodiments can be specifically implemented by a computer chip or an entity, or can be implemented by a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the previous apparatus is divided to various units based on functions for separate description when the previous apparatus is described. Certainly, during implementation of one or more embodiments of this specification, the functions of the units can be implemented in one or more pieces of software and/or hardware.

A person skilled in the art should understand that one or more embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

One or more embodiments of this specification are described with reference to the flowcharts and/or block diagrams of the method, the device (system), and the computer program product based on the embodiments of this specification. It should be understood that, computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more procedures in the flowcharts and/or in one or more blocks in the block diagrams.

These computer program instructions can alternatively be stored in a computer-readable memory that can instruct a computer or an another programmable data processing device to work in a specific way, so the instructions stored in the computer-readable memory generate an artifact that includes an instruction apparatus. The instruction apparatus implements a specific function in one or more procedures in the flowcharts and/or in one or more blocks in the block diagrams.

These computer program instructions can alternatively be loaded onto a computer or another programmable data processing device, so a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent and non-persistent, removable and non-removable media, which can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. As described in this specification, the computer-readable medium does not include computer-readable transitory media such as a modulated data signal and a carrier.

It should be further noted that, the terms “include”, “include”, or any other variant thereof are intended to cover a non-exclusive inclusion, so a process, a method, a product, or a device that includes a list of elements not only includes those elements but also includes other elements that are not expressly listed, or further includes elements inherent to such a process, method, product, or device. Without more constraints, an element preceded by “includes a . . . ” does not preclude the existence of additional identical elements in the process, method, product, or device that includes the element.

One or more embodiments of this specification can be described in the general context of computer-executable instructions executed by a computer, for example, a program module. Generally, the program module includes a routine, a program, an object, a component, a data structure, etc. executing a specific task or implementing a specific abstract data type. This specification can alternatively be practiced in distributed computing environments. In the distributed computing environments, tasks are performed by remote processing devices connected through a communication network. In the distributed computing environments, the program module can be located in a local and remote computer storage medium including a storage device.

The embodiments of this specification are described in a progressive way. For the same or similar parts of the embodiments, mutual references can be made between the embodiments. Each embodiment focuses on a difference from other embodiments. Particularly, the system embodiments are basically similar to the method embodiments, and therefore are described briefly. For related parts, references can be made to related descriptions in the method embodiments.

The previous descriptions are merely one or more embodiments of this specification and are not intended to limit this specification. A person skilled in the art can make various changes and variations to the one or more embodiments of this specification. Any modifications, equivalent replacements, and improvements made within the spirit and principle of the one or more embodiments of this specification shall fall within the scope of the claims of the one or more embodiments of this specification.

What is claimed is:

1. An e-bill mail processing method, comprising:

determining to-be-processed identification information used to identify an organization corresponding to a target bill mail;

parsing a bill mail template library for positioning information of a respective bill link of bill mails corresponding to each organization comprised in the bill mail template library, the positioning information indicating a location of the respective bill link, the target bill mail being one of the bill mails;

matching the to-be-processed identification information with identification information corresponding to each organization comprised in the bill mail template library;

obtaining the bill link comprised in the target bill mail based on a matching result comprising:

upon determining that the matching result is that the matching succeeds, determining positioning information corresponding to the bill link in the target bill mail based on the matched identification information, and obtaining the bill link based on the positioning information;

upon determining that the matching result is that the matching fails, identifying a hyperlink comprised in the target bill mail, obtaining the bill link based on an identification result, and updating the bill mail template library by adding positioning information of the bill link in the target bill mail in association with the to-be-processed identification information; and obtaining an e-bill corresponding to the target bill mail based on the bill link.

2. The method according to claim 1, wherein the determining positioning information corresponding to the bill link in the target bill mail based on the matched identification information comprises:

determining a target organization corresponding to the target bill mail based on the matched identification information;

determining location information of the bill link in the target bill mail based on the positioning information corresponding to the target organization; and obtaining the bill link from the target bill mail based on the location information.

3. The method according to claim 2, wherein the positioning information comprises a keyword used to point to the bill link; and the determining location information of the bill link in the target bill mail based on the positioning information corresponding to the target organization comprises:

searching the target bill mail for the keyword; and determining a link that the identified keyword points to as the bill link.

4. The method according to claim 1, wherein the identifying a hyperlink comprised in the target bill mail, and obtaining the bill link based on an identification result comprises:

obtaining a hyperlink comprised in a specified mail location of the target bill mail, wherein the specified mail location comprises a mail attachment and/or a mail body;

determining a to-be-processed keyword pointing to the hyperlink, and matching the to-be-processed keyword with a predetermined keyword set to obtain a second matching result, wherein the keyword set comprises at least one keyword used to point to the bill link; and determining the bill link from the hyperlink based on the second matching result.

5. The method according to claim 4, wherein the determining the bill link from the hyperlink based on the second matching result comprises:

upon determining that the second matching result is that the matching succeeds, determining that the hyperlink is the bill link; or upon determining that the second matching result is that the matching fails, performing a download operation based on the hyperlink, and determining that the successfully downloaded hyperlink is the bill link.

6. The method according to claim 5, after the performing a download operation based on the hyperlink, further comprising:

obtaining a keyword corresponding to the successfully downloaded hyperlink; and adding the obtained keyword to the keyword set to update the keyword set.

7. The method according to claim 5, after the determining that the successfully downloaded hyperlink is the bill link, further comprising:

determining the positioning information corresponding to the bill link in the target bill mail based on location information of the successfully downloaded hyperlink in the target bill mail; and correspondingly adding the positioning information corresponding to the bill link in the target bill mail and the to-be-processed identification information to the bill mail template library, to update the bill mail template library.

8. The method according to claim 1, wherein the obtaining an e-bill corresponding to the target bill mail based on the bill link comprises:

requesting the bill link to obtain a response body corresponding to the request;

determining a file type of the response body upon determining that a response state of the response body is normal; and obtaining the e-bill corresponding to the target bill mail based on the file type of the response body.

9. The method according to claim 8, wherein the obtaining the e-bill corresponding to the target bill mail based on the file type of the response body comprises:

upon determining that the file type is a downloadable first file type, performing a download operation based on the response body to obtain the e-bill; or upon determining that the file type is a non-downloadable second file type, determining a parsing method corresponding to the bill link based on the file type, parsing the bill link based on the determined parsing method, and obtaining the e-bill based on a parsing result.

10. The method according to claim 9, wherein the first file type comprises at least one of the following: a convenient document format and a file stream; and the second file type comprises at least one of the following: a text and a hypertext markup language.

11. A computing device, comprising a memory and a processor, wherein the memory stores executable instructions that, in response to execution by the processor, cause the processor to:

determine to-be-processed identification information used to identify an organization corresponding to a target bill mail;

parse a bill mail template library for positioning information of a respective bill link of bill mails corresponding to each organization comprised in the bill mail template library, the positioning information indicating a location of the respective bill link, the target bill mail being one of the bill mails;

match the to-be-processed identification information with identification information corresponding to each organization comprised in the bill mail template library;

obtain the bill link comprised in the target bill mail based on a matching result comprising:

upon determining that the matching result is that the matching succeeds, determining positioning information corresponding to the bill link in the target bill mail based on the matched identification information, and obtaining the bill link based on the positioning information;

upon determining that the matching result is that the matching fails, identifying a hyperlink comprised in the target bill mail, obtaining the bill link based on an identification result, and updating the bill mail template library by adding positioning information of the bill link in the target bill mail in association with the to-be-processed identification information; and obtain an e-bill corresponding to the target bill mail based on the bill link.

12. A non-transitory computer-readable storage medium, comprising instructions stored therein that, when executed by a processor of a computing device, cause the processor to:

determine to-be-processed identification information used to identify an organization corresponding to a target bill mail;

parse a bill mail template library for positioning information of a respective bill link of bill mails corresponding to each organization comprised in the bill mail template library, the positioning information indicating a location of the respective bill link, the target bill mail being one of the bill mails;

match the to-be-processed identification information with identification information corresponding to each organization comprised in the bill mail template library;

obtain the bill link comprised in the target bill mail based on a matching result comprising:

upon determining that the matching result is that the matching succeeds, determining positioning information corresponding to the bill link in the target bill mail based on the matched identification information, and obtaining the bill link based on the positioning information; and upon determining that the matching result is that the matching fails, identifying a hyperlink comprised in the target bill mail, obtaining the bill link based on an identification result, and updating the bill mail template library by adding positioning information of the bill link in the target bill mail in association with the to-be-processed identification information;

obtain an e-bill corresponding to the target bill mail based on the bill link.

* * * * *